US009151973B2

United States Patent
Son

(10) Patent No.: US 9,151,973 B2
(45) Date of Patent: Oct. 6, 2015

(54) LIQUID CRYSTAL DISPLAY DEVICE FOR PREVENTING LEAKAGE OF LIGHT AT CORNER THEREOF

(75) Inventor: Suk-Ho Son, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 473 days.

(21) Appl. No.: 12/968,452

(22) Filed: Dec. 15, 2010

(65) Prior Publication Data

US 2011/0149192 A1    Jun. 23, 2011

(30) Foreign Application Priority Data

Dec. 18, 2009  (KR) .................. 10-2009-0127441

(51) Int. Cl.
*G02F 1/1333* (2006.01)
*F21V 15/00* (2015.01)
*F21V 13/00* (2006.01)
*F21V 17/00* (2006.01)
*F21V 8/00* (2006.01)

(52) U.S. Cl.
CPC ........ *G02F 1/133308* (2013.01); *G02B 6/0081* (2013.01); *G02F 2001/13332* (2013.01); *G02F 2001/133314* (2013.01); *G02F 2001/133317* (2013.01)

(58) Field of Classification Search
CPC ............... G02F 1/133308; G02F 2001/13314; G02F 2001/13317; G02F 2001/13332; G02F 1/1336; G02F 2001/133325; G02F 1/133608; G02F 1/133615; G02F 2001/133322; G02B 6/0088; G02B 6/005; G02B 6/0091
USPC .......................... 349/58, 61–65; 362/632–634
See application file for complete search history.

(56) References Cited

U.S. PATENT DOCUMENTS

| | | | |
|---|---|---|---|
| 2007/0211496 A1* | 9/2007 | Ito ................................ | 362/633 |
| 2008/0043168 A1* | 2/2008 | Hsiao .............................. | 349/58 |
| 2008/0123336 A1* | 5/2008 | Arita et al. ..................... | 362/257 |
| 2008/0297695 A1* | 12/2008 | Sekiguchi et al. .............. | 349/65 |
| 2008/0303971 A1* | 12/2008 | Lee et al. ......................... | 349/58 |
| 2009/0103001 A1* | 4/2009 | Choi .............................. | 349/58 |

* cited by examiner

*Primary Examiner* — Hoan C Nguyen
(74) *Attorney, Agent, or Firm* — Morgan, Lewis & Bockius LLP

(57) ABSTRACT

In a liquid crystal display (LCD) device, the adjacent sides of a bottom cover, a guide panel, and an top cover are separated to form spaces, and the separated spaces are not aligned to thus prevent a leakage of light to corner regions.

6 Claims, 17 Drawing Sheets

LIQUID CRYSTAL DISPLAY DEVICE FOR PREVENTING LEAKAGE OF LIGHT AT CORNER THEREOF

BACKGROUND OF THE INVENTION

1. Field of the Invention

The present invention relates to a liquid crystal display device and, more particularly, to a liquid crystal display device capable of preventing a leakage of light to a corner area of the liquid crystal display device by altering the structure of a bottom cover, a guide panel, and an top cover.

2. Description of the Related Art

Recently, as diverse mobile electronic devices such as mobile phone, PDA, notebook computer, and the like, are advanced, demand for a flat panel display device which is lighter, thinner, shorter, and smaller that can be applicable to the devices is increasing. Research on a liquid crystal display (LCD), a plasma display panel (PDP), a field emission display (FED), a vacuum fluorescent display (VFD) has been actively conducted as a flat panel display device, and thanks to its advantages of being mass-produced, easiness of a driving unit, implementation of a high picture quality, realization of a large-scale screen, the LCD receives much attention.

The LCD is a transmissive display device that displays a desired image on a screen by adjusting the amount of light transmitting through a liquid crystal layer according to a refractive index anisotropy of liquid crystal molecules. Thus, the LCD includes a backlight, a light source, providing light that transmits through a liquid crystal layer to display an image. In general, the backlight is divided into two types: a side type backlight in which lamps are installed at the side of a liquid crystal panel and provide light to the liquid crystal layer; and a direct type backlight in which lamps provide light directly from a lower portion of a liquid crystal panel.

The side type backlight is installed at the side of the liquid crystal panel to provide light to the liquid crystal layer via a reflective plate and a light guide plate. Thus, because the side type backlight can contribute to reduce the thickness, it is largely used for a notebook computer, and the like, that requires a thin display device. However, the lamps for emitting light of the side type backlight are positioned at the side of the liquid crystal panel, the side type backlight cannot be applicable to a large liquid crystal panel and, in addition, because light is supplied through the light guide plate, a high luminance cannot be obtained. Thus, the side type backlight is not suitable for a liquid crystal panel in use for a large-scale LCD TV which recently draws much attention.

As for the direct type backlight, because light emitted from lamps is directly supplied to the liquid crystal layer, the direct type backlight can be applicable to a large liquid crystal panel. In addition, the direct type backlight has a high luminance, it can be largely used in fabricating a liquid crystal panel for an LCD TV.

Meanwhile, recently, a light emitting device which emits light by itself is used as a light source as a lamp of the backlight, instead of a fluorescent lamp. The light emitting device emits R, G, and B monochromatic light, so when it is applied for the backlight, it has a good color reproductivity and reduces driving power.

FIG. 1 is a schematic sectional view showing the structure of the related art LCD including a backlight having the LEDs as described above.

As shown in FIG. 1, the LCD includes a liquid crystal panel 10 including a first substrate 1, a second substrate 2, and a liquid crystal layer (not shown) interposed between the first and second substrates and implementing an image upon receiving a signal applied from an external source, an LED substrate 32 disposed at the side of a lower portion of the liquid crystal panel 10 and including a plurality of LEDs 34 emitting light, a light guide plate 35 disposed at the lower portion of the liquid crystal panel 10 and guide light emitted from the LEDs 34 to supply it to the liquid crystal panel 10, an optical sheet 38 provided between the liquid crystal panel 10 and the light guide plate 35 and including a diffusion sheet 38a for diffusing and concentrating light guided by the light guide plate 35 so as to be supplied to the liquid crystal panel 10 and prism sheets 38b and 38c, a reflective plate 36 disposed under the light guide plate 35 and reflecting light guide to the lower side of the light guide plate 35, a bottom cover 40 accommodating the reflective plate 36, the light guide plate 35, the optical sheet 38, and the LED substrate 32, a guide panel 42 coupled with the bottom cover 40 to assemble the reflective plate 36, the light guide plate 35, the optical sheet 38, and the LED substrate 32, on which the liquid crystal panel 10 being positioned, and an top cover 46 coupled with the guide panel 42 to assemble the liquid crystal panel 10.

The first substrate 1 of the liquid crystal panel 10 is a thin film transistor (TFT) array substrate including TFT. Various wirings and pixel electrodes, as well as the TFTs, are formed on the first substrate 1. The second substrate 2 is a color filter substrate, on which color filter layers and black matrixes are formed.

The backlight including the reflective layer 36, the light guide plate 35, the optical sheet 38, the LED 34, and the like is assembled to the bottom cover 40. A wall surface of the bottom cover 40 extends in an upward direction from a bottom surface, and the components of the backlight are placed at the interior of the wall surface to assemble the backlight. The top cover 46 is assembled with the guide panel 42 and the bottom cover 40 to assemble the liquid crystal panel 10 and the backlight.

However, the LCD device having such a configuration as described above has the following problem. That is, generally, when the LED 34 is used as a light source of the backlight, the bottom cover 40, the guide panel 42, and the top cover 46 are made of a metal having good thermal conductivity in order to effectively externally discharge heat generated from the LED 34 to prevent a rise in temperature of the backlight. In this case, when the bottom cover 40, the guide panel 42, and the top cover 46 are made of metal, they are pressed.

Meanwhile, the side extending in an upward direction or in a downward direction is formed at the bottom cover 40, the guide panel 42 and the top cover 46. Thus, the bottom cover 40, the guide panel 42, and the top cover 46 are formed through pressing, and in this case, in order to form the side extending in the upward direction or the downward direction by folding an outer area, the corners of the region where four sides are to be formed must be chamfered so as to be discontinuous.

Accordingly, because the four sides of the bottom cover 40, the guide panel 42, and the top cover 46 are formed to be discontinuous with the adjacent sides, separated by a certain interval, when the LCD device is assembled, light is leaked to the separated spaced. This will now be described with reference to FIG. 2.

FIG. 2 illustrates the relationships among the bottom cover 40, the guide panel 42, and the top cover 46 when the bottom cover 40, the guide panel 42, and the top cover 46 are assembled.

As shown in FIG. 2, when the sides of the bottom cover 40, the guide panel 42, and the top cover 46 are folded in the upward direction or in the downward direction, each side is discontinuous with the adjacent sides, leaving a separated space at the corner regions of the bottom cover 40, the guide panel 42, and the top cover 46.

Meanwhile, the LED substrate 32 is disposed at one side of the bottom cover 40, and the light guide plate 35 guiding light emitted from the LED 34 to the liquid crystal panel 10 is disposed on the bottom cover 40. Thus, light propagated to the corner of the light guide plate 35 among light made incident to the light guide plate 35 after being emitted from the LED 34 is leaked to outside through the separated space of the corners of the bottom cover 40, the guide panel 42, and the top cover 46, and this light leakage is a major cause of degrading quality of the LCD device.

SUMMARY OF THE INVENTION

Therefore, in order to address the above matters, the various features described herein have been conceived.

An aspect of the present invention provides a liquid crystal display (LCD) device capable of preventing a leakage of light to a corner area by altering the structure of a bottom cover, a guide panel, and an top cover.

According to an aspect of the present invention, there is provided an LCD device including: a liquid crystal panel; a light source substrate disposed at the side of a lower portion of the liquid crystal panel and including a plurality of light sources mounted thereon and emitting light; a light guide plate disposed at the lower portion of the liquid crystal panel and guiding light made incident from the light sources toward the liquid crystal panel; a bottom cover and a guide panel coupling the light guide plate and the light source substrate; and an top cover surrounding upper edges of the liquid crystal panel and coupled with the bottom cover and the guide panel to couple the liquid crystal panel, the light guide plate and the light source substrate, wherein separated spaces are formed among the adjacent sides of the bottom cover, the guide panel, and the top cover, and the separated space of the bottom cover, that of the guide panel, and that of the top cover are not aligned.

According to an exemplary embodiment of the present invention, because the separated spaces formed at the corner regions of the bottom cover, the guide panel, and the top cover of the LCD device are not aligned, a path of light leakage can be changed and the area of the path can be reduced, thus preventing a light leakage.

The foregoing and other objects, features, aspects and advantages of the present invention will become more apparent from the following detailed description of the present invention when taken in conjunction with the accompanying drawings.

DETAILED DESCRIPTION OF THE INVENTION

A liquid crystal display (LCD) device according to an exemplary embodiment of the present invention will now be described with reference to the accompanying drawings.

The LCD device according to an exemplary embodiment of the present invention can prevent a leakage of light to a corner region of LCD device. When the sides of a bottom cover, a guide panel and an top cover of the LCD device are formed to be discontinuous, separated spaces are formed at the corner regions of the bottom cover, the guide panel and the top cover, from which light is leaked.

In general, in an LCD device using a fluorescent lamp as a light source, a lamp holder is formed at a corner region to fix the fluorescent lamp, so light generated from the fluorescent lamp is interrupted by the lamp holder, preventing a leakage of light to the corner region. However, when a light emitting diode (LED) is used as a light source, the lamp holder is not provided at the corner region, so means for preventing a leakage of light to the corner region is required.

One of the easiest methods for interrupting a leakage of light to the corner region is to install a light blocking member (or a light shielding member) at the corner region. For example, a light shielding tape may be attached between the mutually adjacent sides of the bottom cover, the guide panel and the top cover to block the separated space, a leakage of light to the region can be prevented. In this case, however, a fabrication cost of the LCD device increases due to the light blocking tape, and also because the process of attaching the light blocking tape to the separated spaces of the bottom cover, the guide panel and the top cover is additionally performed, the fabrication process is complicated. In particular, because the light blocking tape is attached to each of the adjacent sides of the bottom cover, the guide panel and the top cover at the separated spaces, making it difficult to automate it, resulting in that a great deal of manpower is required, and if automated, the cost according to the automation increases.

In the present invention, in order to block light leaked to the separated spaces of the bottom cover, the guide panel and the top cover, the structure of the bottom cover, the guide panel and the top cover of the related art is altered, without using a light blocking unit such as the light blocking tape. Thus, light can be easily blocked without increasing the fabrication cost or making the process complicated compared with the related art.

Figure 3:
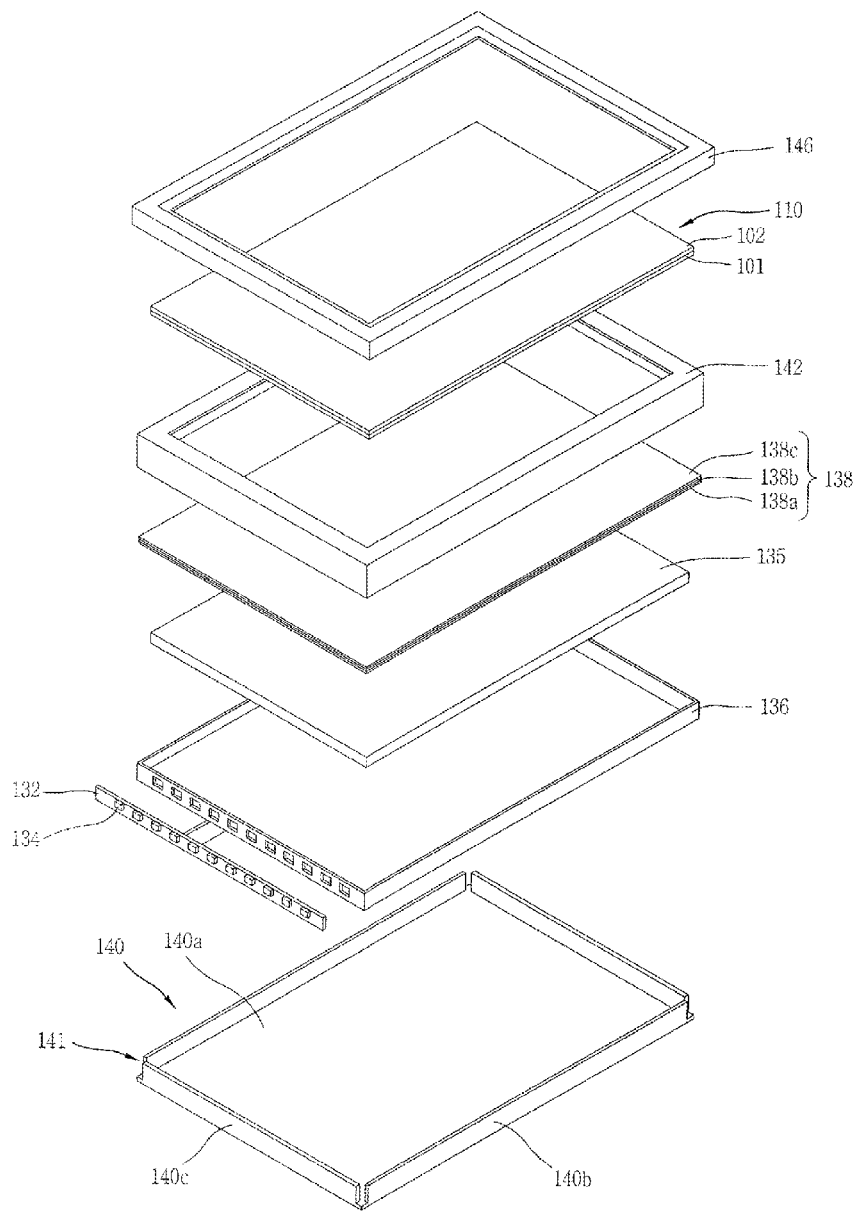
FIG. 3 is an exploded perspective view showing the structure of the LCD device according to a first exemplary embodiment of the present invention.

FIG. 3 is an exploded perspective view showing the structure of the LCD device according to a first exemplary embodiment of the present invention.

As shown in FIG. 3, the LCD device according to a first exemplary embodiment of the present invention includes a liquid crystal panel 110 and a backlight. The liquid crystal panel 110 includes a first substrate 101, a second substrate 102, and a liquid crystal layer (not shown) formed between the first and second substrates, and implements an image when a signal is applied from an external source.

The backlight includes an LED substrate 132 disposed at the side of a lower portion of the liquid crystal panel 110 and having a plurality of LEDs mounted thereon to emit light, a light guide plate 135 disposed at a lower portion of the liquid crystal panel 110 and guiding light emitted from the LEDs 134 to supply it to the liquid crystal panel 110, an optical sheet 138 provided between the liquid crystal panel 110 and the light guide plate 135 and including a diffusion sheet 138a and prism sheets 138b and 138c for diffusing and concentrating light supplied to the liquid crystal panel 110 after being guided by the light guide plate 135, and a reflective plate 136 disposed at a lower portion of the light guide plate 135 and reflect light guide to the lower portion of the light guide plate 135.

The reflective plate 136, the light guide plate 135, the optical sheet 138, and the LED substrate 132 of the backlight are received in a bottom cover 140 and assembled as the bottom cover 140 and the guide panel 142 are coupled.

The liquid crystal panel 110 is placed at an upper portion of the guide panel 142. The guide panel 142 has a rectangular shape, and edge regions of the liquid crystal panel 110 are placed on the guide panel 142.

An top cover 146 is placed at the upper edges of the liquid crystal panel 110, and as the top cover 146 is coupled with the bottom cover 140 and the guide panel 142, the liquid crystal panel 110 and the backlight are assembled to complete the LCD device.

Although not shown, a plurality of gate lines and data lines are arranged vertically and horizontally to define a plurality of pixel areas on the first substrate 101. A thin film transistor (TFT), a switching element, is formed at each pixel area, and a pixel electrode is formed on the pixel area. Each TFT includes a gate electrode connected with a gate line, a semiconductor layer formed by stacking amorphous silicon or the like on the gate electrode, and source and drain electrodes formed on the semiconductor layer and connected with a data line and the pixel electrode.

The second substrate 102 includes color filters including a plurality of subcolor filters implementing red (R), green (G), and blue (B) color, and black matrixes demarcating the subcolor filters and blocking light transmission to the liquid crystal layer.

The first and second substrates 101 and 102 are attached in a facing manner by a sealant (not shown) formed on the edges of an image display area to form the liquid crystal panel. In this case, the attachment of the first and second substrates 101 and 102 is made by an attachment key (not shown) formed on the first substrate 101 or the second substrate 102.

Although not shown, first and second polarizers are attached on the first and second substrates 101 and 102 to polarize light input to or output from the liquid crystal panel 110 to implement an image.

The light guide plate 135 serves to guide light inputted from the LED 134 to the liquid crystal panel 110. When light made incident to one side of the light guide plate 135, it is reflected from upper and lower surfaces of the light guide plate 135 and transmitted to the other side of the light guide plate 135 and then outputted to outside of the light guide plate 135. The light guide plate 135 has a rectangular parallelepiped, and may have a pattern, a recess, or the like, formed on its lower surface in order to diffuse light made incident thereto.

The reflective plate 136 is extendedly formed on portions of the side and upper surface of the light guide plate 135 as well as on the lower surface of the light guide plate 135. An area of the reflective plate 136, which corresponds to the LED 134, at the side where the LED 134 is disposed is removed to form a window, and the LED 134 is disposed at the window.

The optical sheet 138 improves the efficiency of light outputted from the light guide plate 135 and provides the same to the liquid crystal panel 110. The optical sheet 138 includes a diffusion sheet 138a for diffusing light outputted from the light guide plate 135, and first and second prism sheets 138b and 138c for concentrating light which has been diffused by the diffusion sheet and providing uniform light to the liquid crystal panel 110. One diffusion sheet 138a is provided, while the first and second prism sheets 138b and 138c are provided where prism is vertically cross in x and y axes directions to refract light in the x and y axes direction to improve straightness of light.

As the LED 134, R, G, and B LEDs emitting monochromatic light of R, G, and B or an LED emitting white light may be used.

When the LEDs emitting monochromatic light are disposed, the R, G, and B monochromatic light LEDs are alternately disposed at certain intervals, the monochromatic light emitted from the LEDs are mixed into white light so as to be supplied to the liquid crystal panel 110. In case where the LED emitting white light is provided, a plurality of LEDs are disposed at certain intervals to supply white light to the liquid crystal panel 110.

The white light LED includes a blue LED emitting blue color and a phosphor absorbing the blue monochromatic light to emit yellow light, so that the blue monochromatic light outputted from the blue LED and the yellow monochromatic light emitted from the phosphor are mixed so as to be provided as white light to the liquid crystal panel 110. In the drawing, the LED 134 is disposed at one side of the light guide plate 135, but the LED 134 may be disposed at both sides of the light guide plate 135.

The LEDs 134 are mounted on the LED substrate 132. As the LED substrate 132, an opaque PCB or a flexible circuit board may be used. Alternatively, a substrate made of metal may be used as the LED substrate 132. The LED substrate 132 is disposed along the side of the light guide plate 135 to face the side of the light guide plate 135. With the LED 134 mounted on the LED substrate 132, light is made incident to the light guide plate 135 through the side of the light guide plate 135. In the drawing, the LED substrate 132 is disposed only one side of the light guide plate 135, but the LED substrate 132 may be disposed on both sides of the light guide plate 135 to allow light to be inputted to the light guide plate 135 through both sides of the light guide plate 135.

A signal wiring is formed on the upper or lower surface of the LED substrate 132 and electrically connected with a lead line of the LED 134. An inverter for applying power to the LED, a connector connecting the inverter and the LED and an LED controller may be mounted on the LED substrate 132. The inverter, the connector connecting the inverter and the LED unit and the LED controller controlling the LED unit are connected to the LED 134 through the signal wiring formed on the LED substrate 132.

The reflective plate 136 is positioned on a front surface of the LED substrate 132. In this case, the reflective plate 136 includes a plurality of windows, making a portion of the LED substrate 132 (namely, a mounting area of the LED 134) exposed through the windows and the LEDs 134 mounted on the LED substrate 132 to face the side of the light guide plate 135 through the windows, allowing light to be made incident through the side of the light guide plate 135.

The bottom cover 140 includes a bottom surface 140a on which the reflectively plate 136 is positioned, first sides 140b upwardly extending from the bottom surfaces 140a and face each other in parallel, and second sides 140c upwardly extending from the bottom surface 140a, disposed to be perpendicular to the first sides 140b, and facing each other in parallel.

The mutually adjacent first sides 140b and second sides 140c are formed to be discontinuous, and a separated space 141 is formed therebetween. In this case, a side section of the first side 140b and a side section of the second side 140c do not face each other at the corner area, but the side section of the first side faces a front surface of the second side section 140c, so the separated space 141 is not precisely aligned with the corner area of the bottom cover 140 but formed at an area which is slightly goes awry.

The guide panel 142 is coupled with the bottom cover 140 such that its upper surface covers the edges of the optical sheet 138 of the liquid crystal panel and the side of the bottom cover 140. The liquid crystal panel 110 is mounted on the upper surface of the guide panel 142, and the top cover 146 covers the outer edges of the liquid crystal panel 110, thus assembling the liquid crystal panel 110 and the backlight.

The coupling relationships of the bottom cover 140, the guide panel 142, and the top cover 146 of the LCD device according to an exemplary embodiment of the present invention will now be described in detail.

Figure 4A:
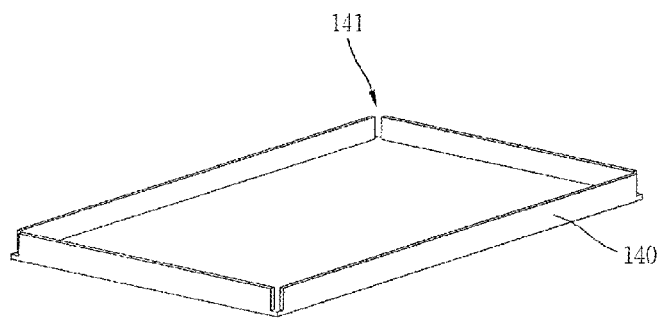
FIGS. 4a to 4c show a separated space formed at a bottom cover.
Figure 4B:
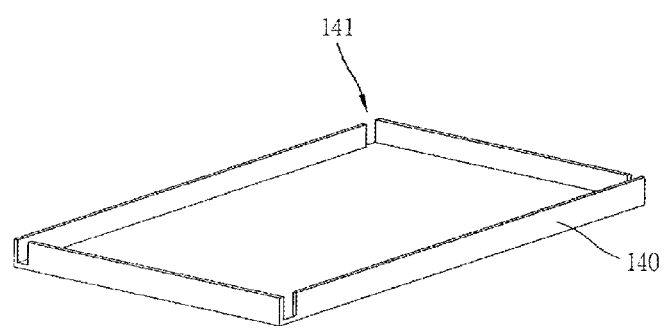
Figure 4C:
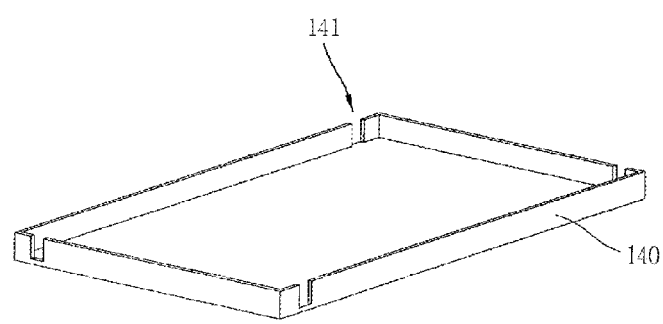

FIGS. 4a to 4c show a separated space 141 formed at the bottom cover 140, the guide panel 142, and the top cover 146. Only the top cover 140 is illustrated for the sake of brevity. A separated space formed at the guide panel 142 and the top cover 146 is also substantially same as that of the separated space of the bottom cover 140, so the separate space 141 of the bottom cover 140 will be described.

As shown in FIG. 4a, the separated space 141 is formed at the corner area of the bottom cover 140. Portions of the two adjacent sides 140b and 140c forming the corner are removed to form the separated space 141 precisely at the center of the corner area.

Also, as shown in FIG. 4b, the separated space 141 may be formed at an area of one side 140b away from the corner area. Namely, a portion of one side among the two adjacent sides 140b and 140c is removed while the other side is not removed, whereby the separated space 141 is formed at an area of one side 140b away from the corner area. In this case, in the drawing, the separated space 141 is formed at an area in a particular direction from the corner area, but without being limited thereto, the separated space 141 may be formed at an area of the left or right side based on the corner area.

As shown in FIG. 4c, the separated space 141 is formed to be spaced apart from the corner area. Namely, the side 140b at a portion spaced apart from the corner area is removed to form the separated space 141. In this case, the separated space 141 may be formed at an area spaced apart from the left or right side based on the corner area.

FIGS. 5a to 5d are conceptual views showing an example of the coupling relationships of a bottom cover, a guide panel, and an top cover of the LCD device according to an exemplary embodiment of the present invention.

As shown in FIGS. 5a to 5d, two of the bottom cover 140, the guide panel 142 and the top cover 146 include a separated space formed at the center of the corner area, while one of them includes a separated space not formed at the center of the corner area.

Figure 5A:
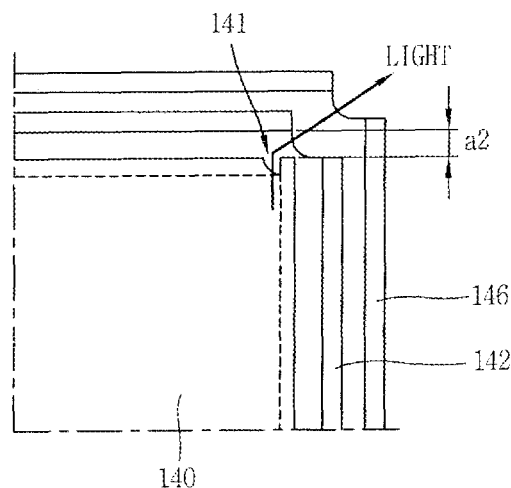
FIGS. 5a to 5d are conceptual views showing an example of the coupling relationships of a bottom cover, a guide panel, and an top cover of the LCD device according to an exemplary embodiment of the present invention.

As shown in FIG. 5a, portions of the two adjacent sides are removed at the corner areas of the guide panel 142 and the top cover 146 to form the separated area at the center of the corner area, while a portion of the left side of the corner area of the bottom cover 140 is removed to form the separated space at the left side from the center of the corner area. Thus, the separated spaces of the guide panel 142 and the top cover 146 face each other at the corner areas of the adjacent sides, the separated spaces between the discontinuously adjacent sides are precisely aligned with the corner areas, but the separated spaces 141 of the bottom cover 140 is formed at an area away from the corner area.

The structure of the LCD device according to an exemplary embodiment of the present invention will now be described compared with that of the related art LCD device illustrated in FIG. 2.

Figure 1:
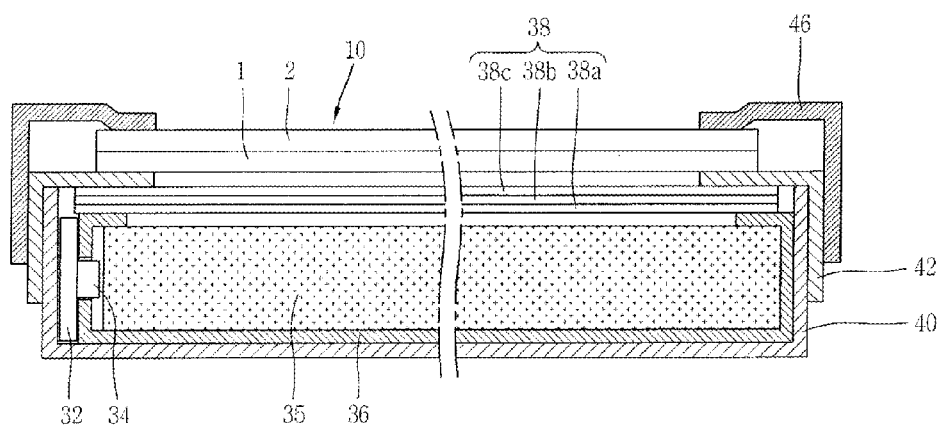
FIG. 1 is a sectional view showing the structure of the related art liquid crystal display (LCD) device.
Figure 2:
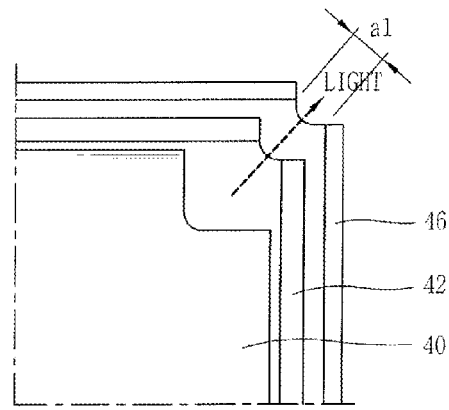
FIG. 2 is a conceptual view showing the coupling relationships of a bottom cover, a guide panel, and an top cover of the related art LCD device.

As shown in FIG. 2, in the related art LCD device, the separated spaces of the bottom cover, the guide panel and the top cover are formed at the corner areas of the bottom cover, the guide panel and the top cover, so the separated spaces of the bottom cover, the guide panel and the top cover correspond to each other at the corner areas. Thus, light outputted fro the light guide plate is leaked to outside through the separated spaces of the corner areas.

In comparison, in the LCD device according to an exemplary embodiment of the present invention, as shown In FIG. 5a, the separated spaces of the guide panel 142 and the top cover 146 are formed at the corner areas, while the separated space of the bottom cover 140 is formed at an area away from the corner, so the separated spaces of the bottom cover 140 is not aligned with the separated spaces of the guide panel 142 and the top cover 146. Thus, in the LCD device according to an exemplary embodiment of the present invention, as shown in FIG. 5a, light outputted from the light guide plate 135 is transmitted through the separated space of the bottom cover 140 and then outputted through the separated spaces of the guide panel 142 and the top cover 146.

In the related art LCD device, because all the separated spaces are aligned, the light emission path is formed in a straight line, while in the LCD device according to the present invention, the separated space of the bottom cover 140 is vertical to the separated spaces of the guide panel 142 and the top cover 146, form a vertical light emission path, and thus, light leakage to outside can be considerably reduced.

In the related art LCD device, the light leakage area is tantamount to an width a1 of the separated spaces of the bottom cover, the guide panel and the top cover, while in the present invention, the light leakage area is tantamount to a space a2 between the end portion of the side of the bottom cover 140 and the guide panel 142. In this case, in the related art LCD device, the width a1 of the separated spaces of the bottom cover, the guide panel, and the top cover is about 0.4 mm, while in the LCD device according to an exemplary embodiment of the present invention, the space a2 between the end portion of the side of the bottom cover 140 and the guide panel 142 is about 0.1 mm, so the light leakage space is remarkably reduced compared with the related art, and thus, a light leakage can be prevented to its maximum level.

Figure 5B:
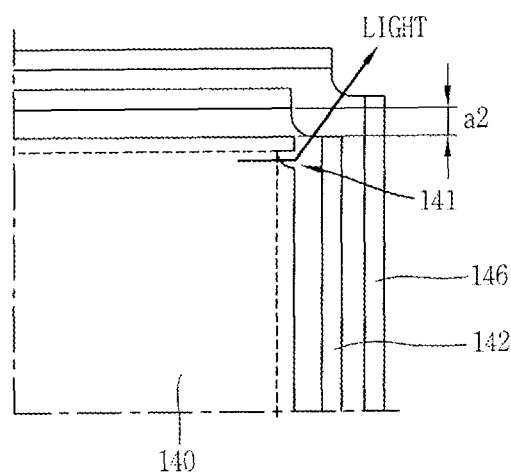

FIG. 5b show an almost same structure as that of FIG. 5a. In FIG. 5a, the separated space 141 is formed at the left side of the corner area of the bottom cover 140, while in the structure illustrated in FIG. 5b, the separated space 141 is formed at the right side of the corner area of the bottom cover 140. Thus, like the structure illustrated in FIG. 5a, the space a2 between the end portion of the side of the bottom cover 140 and the guide panel 142 is about 0.1 mm, significantly reducing the light leakage space compared with the related art, so the light leakage can be prevented to its maximum level.

Figure 5C:
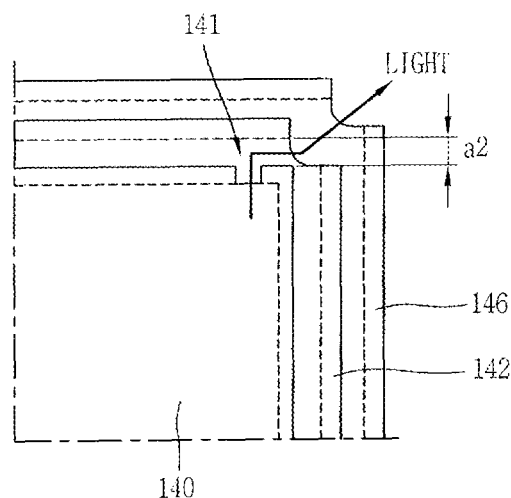
Figure 5D:
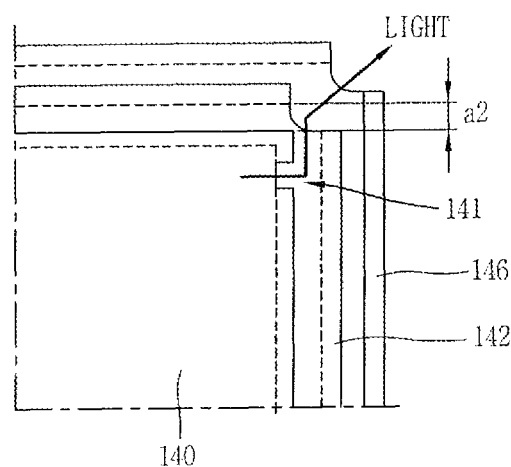

FIGS. 5c and 5d show structures in which portions of two adjacent sides are removed at the corner areas of the guide panel 142 and the top cover 146 to form separated spaces at the center of the corner areas, and a portion spaced apart from the corner area of the bottom cover 140 is removed to form the separated space 141 formed spaced apart to the left and right side.

As described above, in the present invention, the separated space formed between the adjacent sides of the bottom cover is not aligned with the corner area but formed at an area away from the corner. Thus, because the separated space of the bottom cover is not aligned with the separated spaces of the guide panel and the top cover, a light leakage to outside can be drastically reduced compared with the related art.

The present invention is not limited to the foregoing structure. The present invention aims at reducing a light leakage by changing or minimizing a light path of light leakage to outside by changing the structure of the LCD device, so the LCD device according to the present invention may have any structure so long as it can accomplish such aim of the present invention. In other words, the object of the present invention can be achieved by changing or minimizing the light path by changing the structure of the top cover or the guide panel as well as the bottom cover.

Figure 6A:
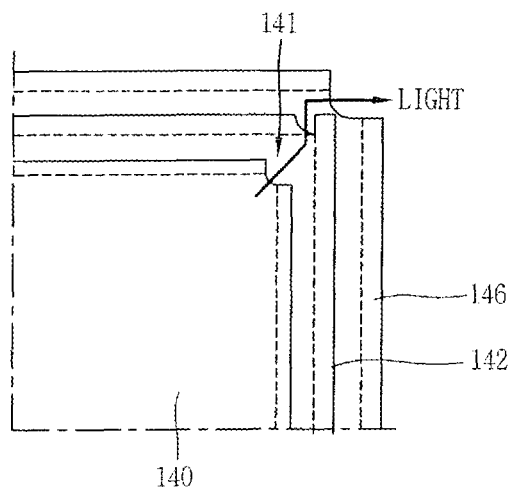
FIGS. 6a and 6b are conceptual views showing another example of the coupling relationships of the bottom cover, the guide panel, and the top cover of the LCD device according to an exemplary embodiment of the present invention.
Figure 6B:
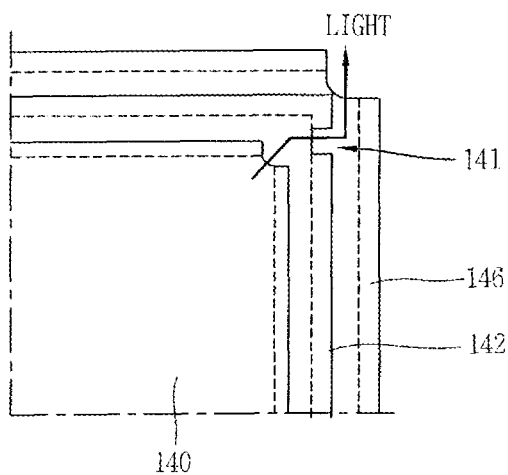

FIGS. 6a and 6b are conceptual views showing another example of the coupling relationships of the bottom cover 140, the guide panel 142, and the top cover 146 of the LCD device according to an exemplary embodiment of the present invention. According to the coupling structure illustrated in FIGS. 6a and 6b, the bottom cover 140 and the top cover 146 include a separated space at an area away to the left side from the center of the corner area or at an area spaced apart to the left or right side from the center of the corner area.

As shown in FIG. 6a, a portion of the left (or right) side among two adjacent sides at the corner area of the guide panel 142 is removed to form a separated space at the area away to the left (or right) side from the center of the corner area of the guide panel 142. Because the separated space is not aligned with those of the bottom cover 140 and the top cover 146, a light leakage can be minimized.

As shown In FIG. 6b, a portion of a left (or right) side of the corner area spaced apart from the corner area of the guide panel 142 is removed to form a separated space spaced apart to the left (or right) side from the center of the corner area of the guide panel 142. Because the separated space of the guide panel 142 is not aligned with those of the bottom cover 140 and the top cover 146, a light leakage can be minimized.

Figure 7A:
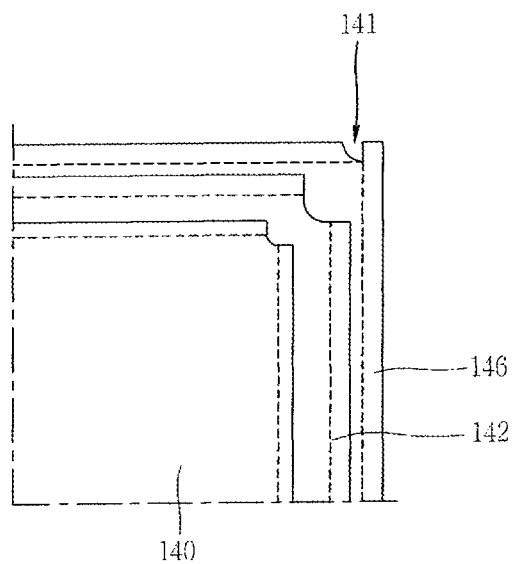
FIGS. 7a and 7b are conceptual views showing another example of the coupling relationships of the bottom cover, the guide panel, and the top cover of the LCD device according to an exemplary embodiment of the present invention.
Figure 7B:
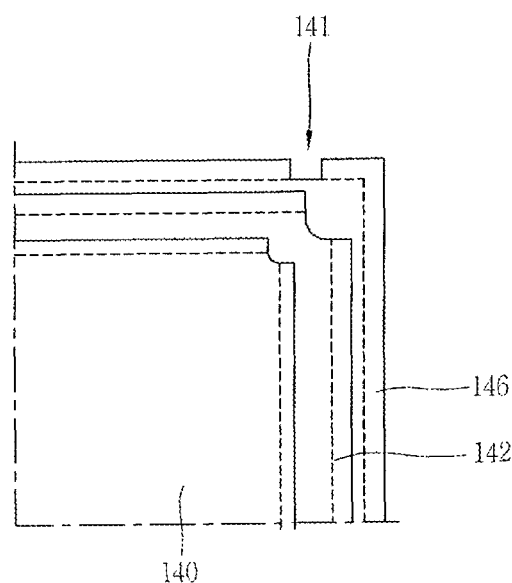

FIGS. 7a and 7b are conceptual views showing another example of the coupling relationships of the bottom cover 140, the guide panel 142, and the top cover 146 of the LCD device according to an exemplary embodiment of the present invention. According to the coupling structures illustrated in FIGS. 7a and 7b, a separated space is formed at the center of the corner area of the bottom cover 140 and the guide panel 142, and a separated space is formed at an area away to the left side from the center of the corner area or at an area spaced apart to left or right side from the center of the corner area.

As shown in FIG. 7a, a portion of a left (or right) side of the corner area spaced apart from the corner area of the top cover 146 is removed to form a separated space spaced apart to the left (or right) side from the center of the corner area of the top cover 146. Because the separated space of the top cover 146 is not aligned with those of the bottom cover 140 and the guide panel 142, a light leakage can be minimized.

FIGS. 8a to 8l are conceptual views showing another example of the coupling relationships of the bottom cover 140, the guide panel 142, and the top cover 146 of the LCD device according to an exemplary embodiment of the present invention. According to the coupling structure illustrated in FIGS. 8a to 8l, one of the bottom cover 140, the guide panel 142 and the top cover 146 includes a separated space formed at the center of the corner area, while the other two of them include a separated space formed at an area away to the left or right side from the center of the corner area or at an area spaced apart to the left or right side from the center of the corner area.

Figure 8A:
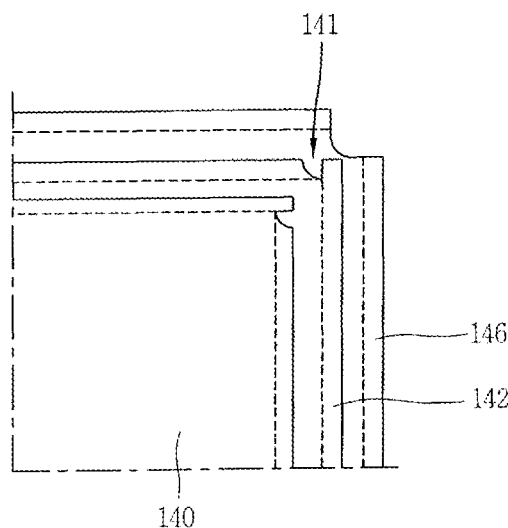
FIGS. 8a to 8l are conceptual views showing another example of the coupling relationships of the bottom cover, the guide panel, and the top cover of the LCD device according to an exemplary embodiment of the present invention.

FIG. 8a illustrates a coupling structure in which a portion of the left (or right) side among two adjacent sides at the corner area of the bottom cover 140 and the guide panel 142 is removed to form a separated space at the area away to the left (or right) side from the center of the corner area of the bottom cover 140 and the guide panel 142. In this case, the separated space may be formed at the left side or right side of the center of the corner area, and the separated spaces of the bottom cover 140 and the guide panel 142 may be formed at the same side (namely, at the left side or right side of the center of the corner area) or may be formed at the mutually opposite side.

Figure 8B:
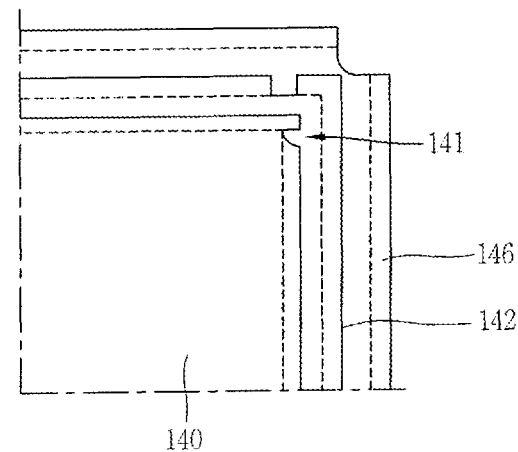

FIG. 8b illustrates a coupling structure in which a portion of the left (or right) side among two adjacent sides at the corner area of the bottom cover 140 is removed to form a separated space at an area away to the left (or right) side from the center of the corner area of the bottom cover 140, and a portion of the left (or right) side of the corner area spaced apart from the corner area of the guide panel 142 is removed to form a separated space spaced apart to the left (or right) side from the center of the corner area of the guide panel 142.

Figure 8C:
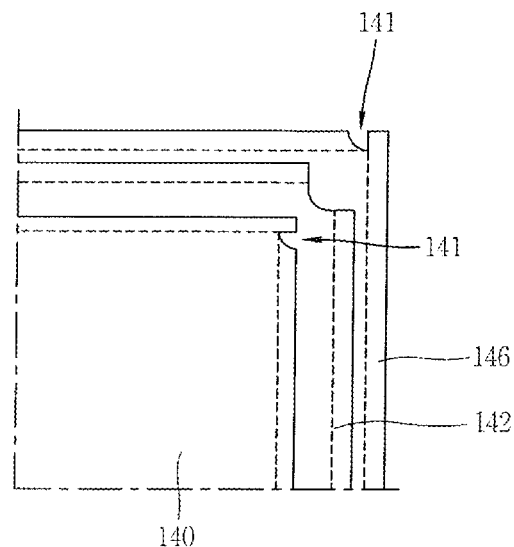

FIG. 8c illustrates a coupling structure in which a portion of the left (or right) side among two adjacent sides at the corner area of the top cover 146 and the bottom cover 140 is removed to form a separated space at an area away to the left (or right) side from the center of the corner area of the top cover 146 and the bottom cover 140.

Figure 8D:
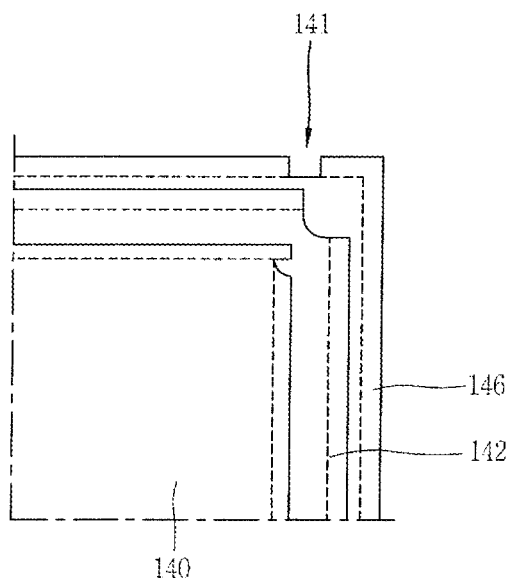

FIG. 8d illustrates a coupling structure in which a portion of the left (or right) side among two adjacent sides at the corner area of the bottom cover 140 is removed to form a separated space at an area away to the left (or right) side from the center of the corner area of the bottom cover 140, and a portion of the left (or right) side of the corner area spaced apart from the corner area of the top cover 146 is removed to form a separated space spaced apart to the left (or right) side from the center of the corner area of the top cover 146.

Figure 8E:
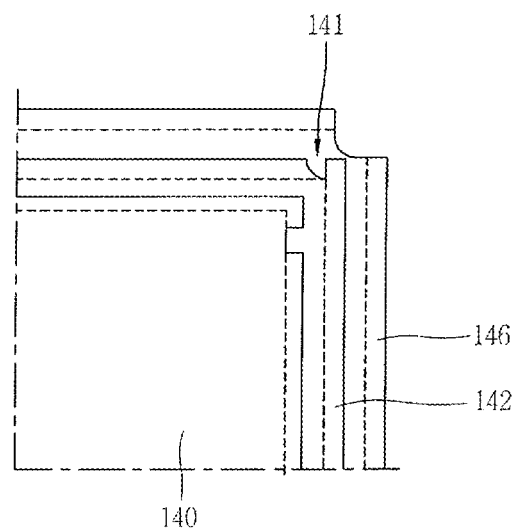

FIG. 8e illustrates a coupling structure in which a portion of the left (or right) side of the corner area spaced apart from the corner area of the bottom cover 140 is removed to form a separated space spaced apart to the left (or right) side from the center of the corner area of the bottom cover 140, and a portion of the left (or right) side among two adjacent sides at the corner area of the guide panel 142 is removed to form a separated space at an area away to the left (or right) side from the center of the corner area of the guide panel 142.

Figure 8F:
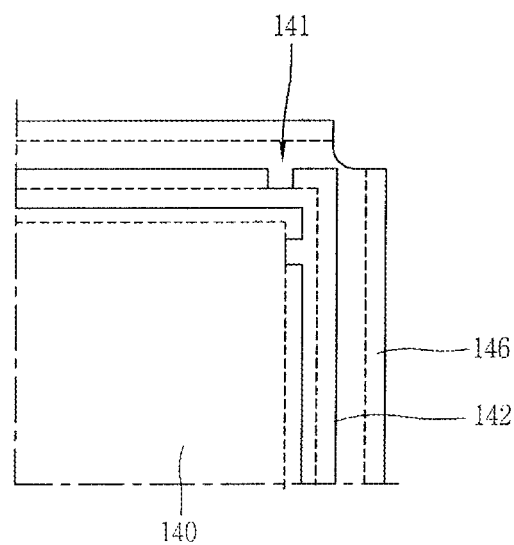

FIG. 8f illustrates a coupling structure in which a portion of the left (or right) side of the corner area spaced apart from the corner area of the bottom cover 140 is removed to form a separated space spaced apart to the left (or right) side from the center of the corner area of the bottom cover 140, and a portion of the left (or right) side of the corner area spaced apart at the corner area of the guide panel 142 is removed to form a separated space spaced apart to the left (or right) side from the center of the corner area of the guide panel 142.

Figure 8G:
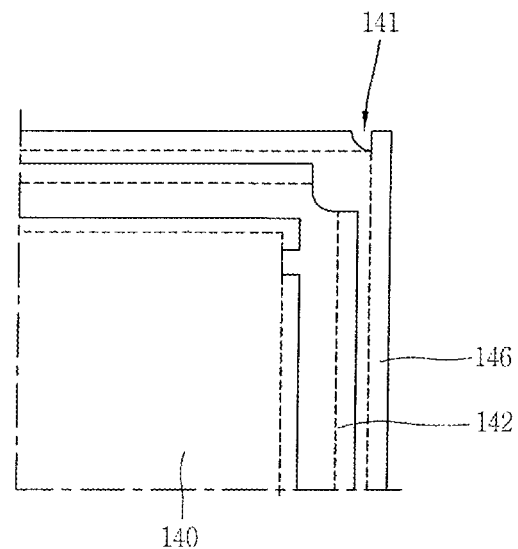

FIG. 8g illustrates a coupling structure in which a portion of the left (or right) side of the corner area spaced apart from the corner area of the bottom cover 140 is removed to form a separated space spaced apart to the left (or right) side from the center of the corner area of the bottom cover 140, and a portion of the left (or right) side among two adjacent sides at the corner area of the top cover 146 is removed to form a separated space at an area away to the left (or right) side from the center of the corner area of the top cover 146.

Figure 8H:
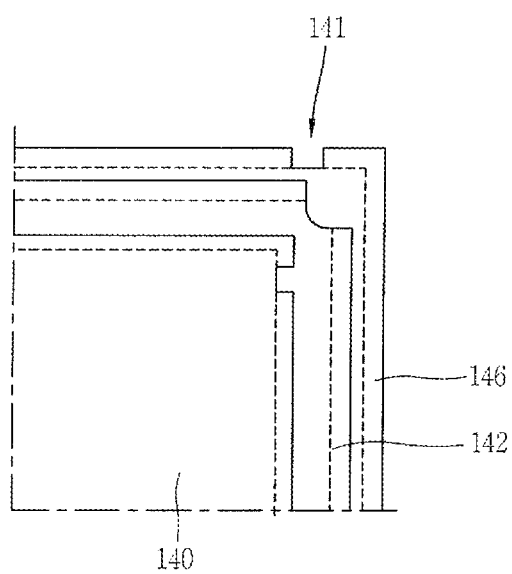

FIG. 8h illustrates a coupling structure in which a portion of the left (or right) side of the corner area spaced apart from the corner area of the bottom cover 140 is removed to form a separated space spaced apart to the left (or right) side from the center of the corner area of the bottom cover 140, and a portion of the left (or right) side of the corner area spaced apart from the corner area of the top cover 146 is removed to form a separated space spaced apart to the left (or right) side from the center of the corner area of the top cover 146.

Figure 8I:
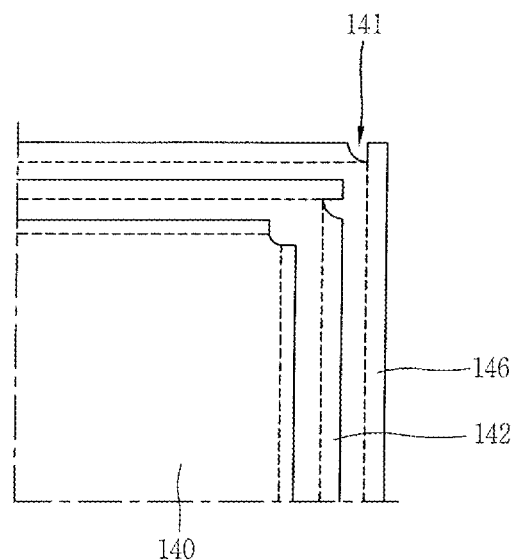

FIG. 8i illustrates a coupling structure in which a portion of the left (or right) side among two adjacent areas at the corner areas of the guide panel 142 and the top cover 146 is removed to form a separated space away to the left (or right) side from the center of the corner areas of the guide panel 142 and the top cover 146. In this case, the separated space may be formed at the left or right side of the center of the corner area, and the separated spaces formed at the guide panel 142 and the top cover 146 may be formed at the same side or may be formed at the mutually opposite side.

Figure 8J:
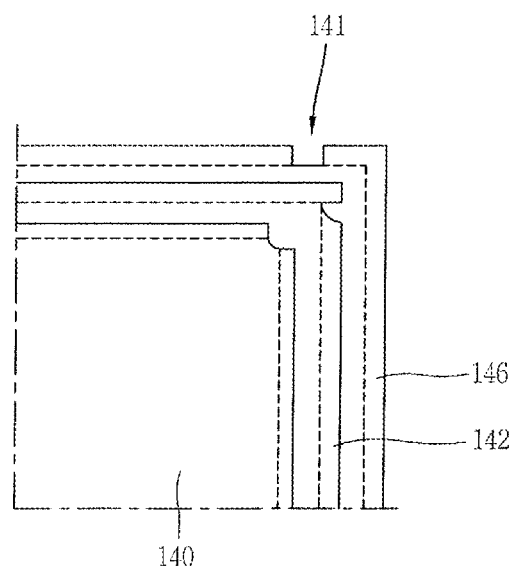

FIG. 8j illustrates a coupling structure in which a portion of the left (or right) side among two adjacent sides at the corner area of the guide panel 142 is removed to form a separated space at an area away to the left (or right) side from the center of the corner area of the guide panel 142, and a portion of the left (or right) side of the corner area spaced apart from the corner area of the top cover 146 is removed to form a separated space spaced apart to the left (or right) side from the center of the corner area of the top cover 146.

Figure 8K:
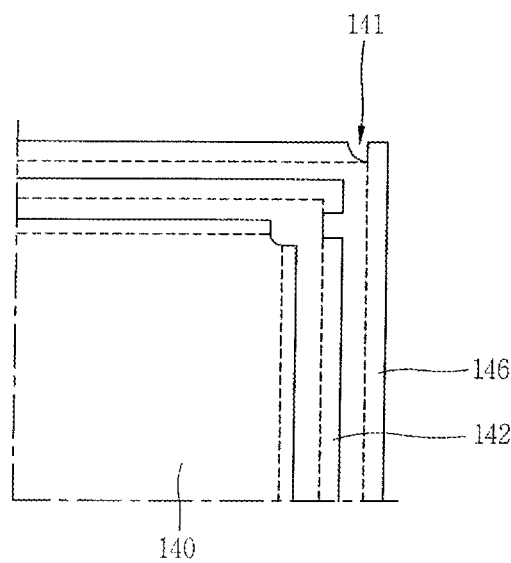

FIG. 8k illustrates a coupling structure in which a portion of the left (or right) side of the corner area spaced apart from the corner area of the guide panel 142 is removed to form a separated space spaced apart to the left (or right) side from the center of the corner area of the guide panel 142, and a portion of the left (or right) side among two adjacent sides at the corner area of the top cover 146 is removed to form a separated space at an area away to the left (or right) side from the center of the corner area of the top cover 146.

Figure 8L:
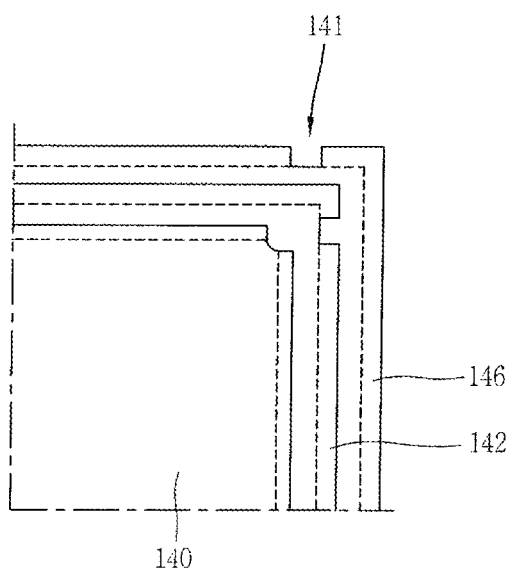

FIG. 8l illustrates a coupling structure in which a portion of the left (or right) side of the corner area spaced apart from the corner area of the guide panel 142 is removed to form a separated space spaced apart to the left (or right) side from the center of the corner area of the guide panel 142, and a portion of the left (or right) side of the corner area spaced apart from the corner area of the top cover 146 is removed to form a separated space spaced apart to the left (or right) side from the center of the corner area of the top cover 146.

FIGS. 9a to 9h are conceptual views showing another example of the coupling relationships of the bottom cover, the guide panel, and the top cover of the LCD device according to an exemplary embodiment of the present invention. According to the coupling structure illustrated in FIGS. 9a to 9h, the bottom cover 140, the guide panel 142 and the top cover 146 all include a separated space formed at an area away to the left or right side from the center of the corner area, or formed at an area spaced apart to the left or right side from the center of the corner area.

Figure 9A:
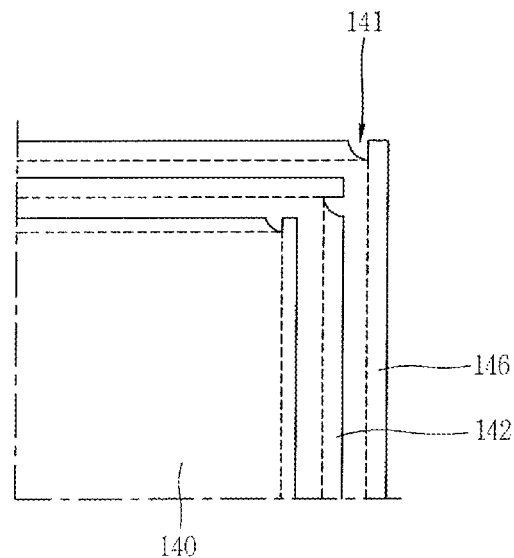
FIGS. 9a to 9h are conceptual views showing another example of the coupling relationships of the bottom cover, the guide panel, and the top cover of the LCD device according to an exemplary embodiment of the present invention.

FIG. 9a illustrates a coupling structure in which a portion of the left (or right) side among two adjacent sides at the corner area of the bottom cover 140, the guide panel 142, and the top cover 146 is removed to form a separated space at the area away to the left (or right) side from the center of the corner area of the bottom cover 140, the guide panel 142, and the top cover 146. In this case, the separated space may be formed at the left side or right side of the center of the corner area, and any combination of the bottom cover 140, the guide panel 142, and the top cover 146 can be possible so long as their separated spaces are not formed at the same side (namely, so long as both of them are not formed at the left or right side of the center of the corner area).

Figure 9B:
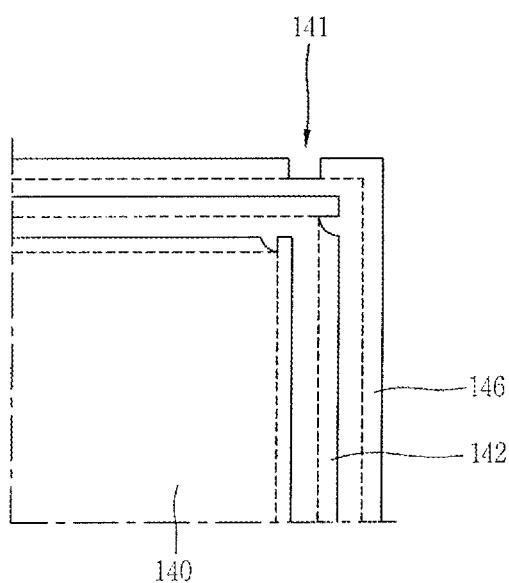

FIG. 9b illustrates a coupling structure in which a portion of the left (or right) side among two adjacent sides at the corner area of the bottom cover 140 and the guide panel 142 is removed to form a separated space at an area away to the left (or right) side from the center of the corner area of the bottom cover 140 and the guide panel 142, and a portion of the left (or right) side of the corner area spaced apart from the corner area of the top cover 146 is removed to form a separated space spaced apart to the left (or right) side from the center of the corner area of the top cover 146.

Figure 9C:
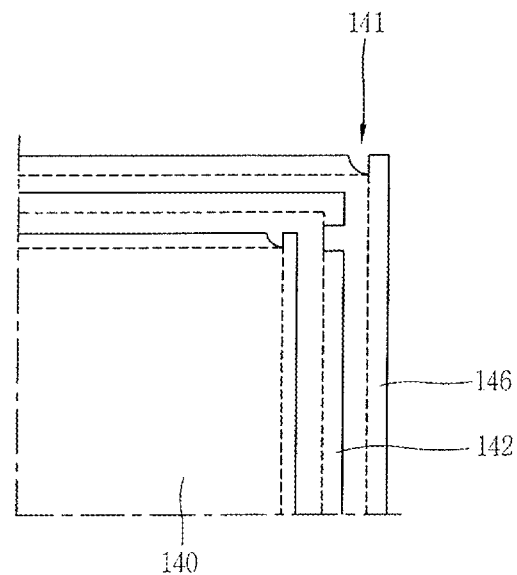

FIG. 9c illustrates a coupling structure in which a portion of the left (or right) side among two adjacent sides at the corner area of the bottom cover 140 and the top cover 146 is removed to form a separated space at an area away to the left (or right) side from the center of the corner area of the bottom cover 140 and the top cover 146, and a portion of the left (or right) side of the corner area spaced apart from the corner area of the guide panel 142 is removed to form a separated space spaced apart to the left (or right) side from the center of the corner area of the guide panel 142.

Figure 9D:
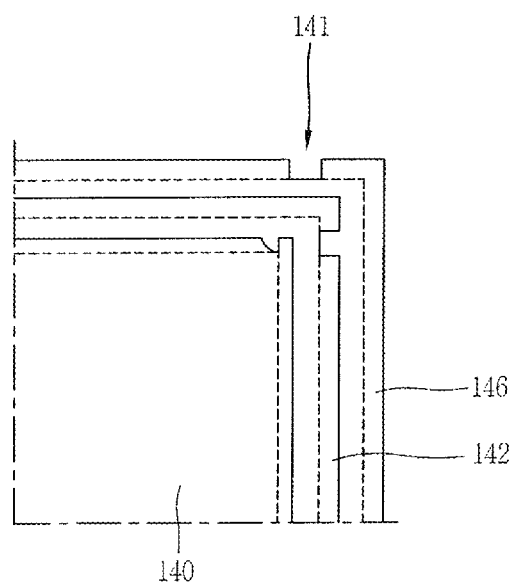

FIG. 9d illustrates a coupling structure in which a portion of the left (or right) side among two adjacent sides at the corner area of the bottom cover 140 is removed to form a separated space at an area away to the left (or right) side from the center of the corner area of the bottom cover 140, and a portion of the left (or right) side of the corner area spaced apart from the corner area of the guide panel 142 and the top cover 146 is removed to form a separated space spaced apart to the left (or right) side from the center of the corner area of the guide panel 142 and the top cover 146.

Figure 9E:
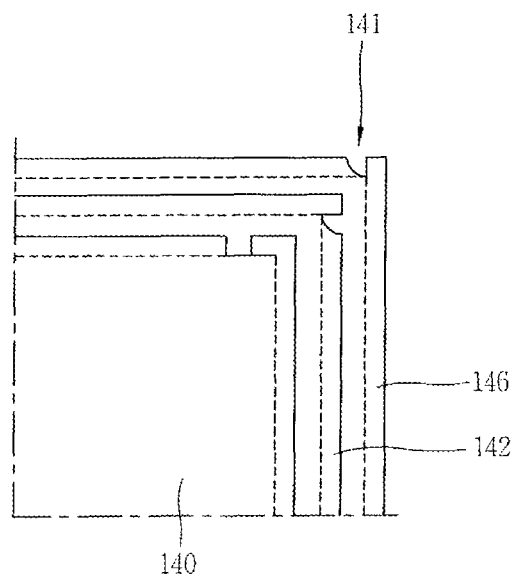

FIG. 9e illustrates a coupling structure in which a portion of the left (or right) side of the corner area spaced apart from the corner area of the bottom cover 140 is removed to form a separated space spaced apart to the left (or right) side from the center of the corner area of the bottom cover 140, and a portion of the left (or right) side among two adjacent sides at the corner area of the guide panel 142 and the top cover 146 is removed to form a separated space at an area away to the left (or right) side from the center of the corner area of the guide panel 142 and the top cover 146.

Figure 9F:
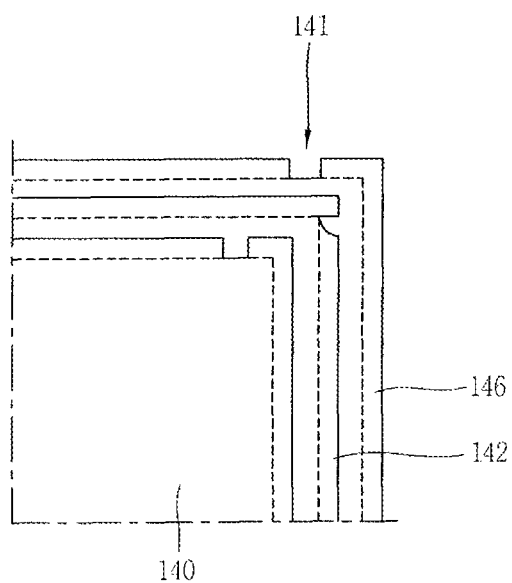

FIG. 9f illustrates a coupling structure in which a portion of the left (or right) side of the corner area spaced apart from the corner area of the bottom cover 140 and the top cover 146 is removed to form a separated space spaced apart to the left (or right) side from the center of the corner area of the bottom cover 140 and the top cover 146, and a portion of the left (or right) side among two adjacent sides at the corner of the guide panel 142 is removed to form a separated space at an area away to the left (or right) side from the center of the corner area of the guide panel 142.

Figure 9G:
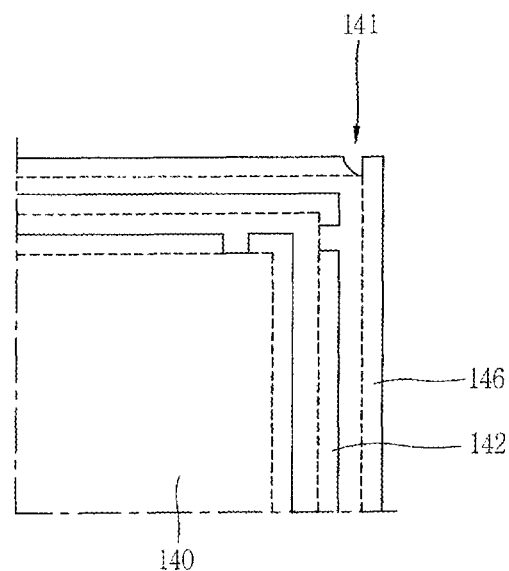

FIG. 9g illustrates a coupling structure in which a portion of the left (or right) side of the corner area and the guide panel 142 spaced apart from the corner area of the bottom cover 140 is removed to form a separated space spaced apart to the left (or right) side from the center of the corner area of the bottom cover 140 and the guide panel 142, and a portion of the left (or right) side among two adjacent sides at the corner area of the top cover 146 is removed to form a separated space at an area away to the left (or right) side from the center of the corner area of the top cover 146.

Figure 9H:
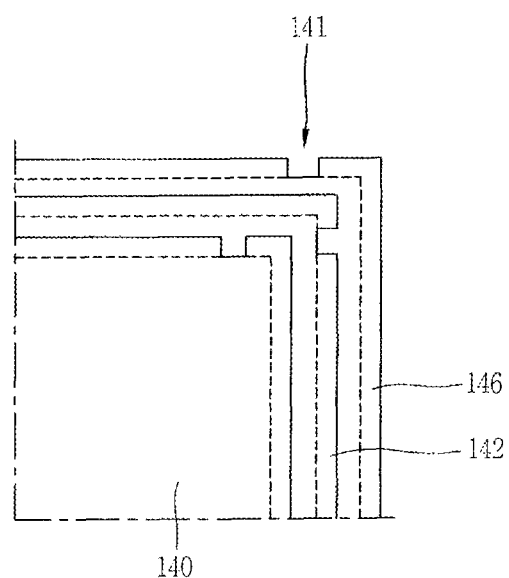

FIG. 9h illustrates a coupling structure in which a portion of the left (or right) side of the corner area spaced apart from the corner area of the bottom cover 140, the guide panel 142, and the top cover 146 is removed to form a separated space spaced apart to the left (or right) side from the center of the corner area of the bottom cover 140, the guide panel 142, and the top cover 146. In this case, the separated space may be formed at the left side or right side of the center of the corner area, and any combination of the bottom cover 140, the guide panel 142, and the top cover 146 can be possible so long as their separated spaces are not formed at the same side (namely, so long as both of them are not formed at the left or right side of the center of the corner area). As described above, in an exemplary embodiment of the present invention, in order to prevent a leakage of light to the corner area of the LCD device, the structure of the bottom cover, the guide panel, and the top cover is altered to change the light leakage path, thus reducing the area of the light leakage path.

Only some of the structures have been described, but the present invention is not limited to such particular structures. That is, structures of the bottom cover, the guide panel, and the top cover can be altered, and various structures may be possible so long as at least one of the separated spaces of the bottom cover, the guide panel, and the top cover is not aligned at the corner area.

Also, only the particular structures of the LCD device are illustrated in the drawings, but the present invention is not limited thereto. For example, in the above description, the LED substrate is formed only at one side of the light guide plate, but without being limited thereto, the LED substrate may be formed at both sides of the light guide plate or may be formed at three or four sides of the light guide plate. Also, in the above description, only the LED is used as the light source, but without being limited thereto, any other lamps such as a fluorescent lamp may be used.

In other words, the LCD device using the basic concept of the present invention according to the embodiments or modifications of the present invention may be easily devised by an ordinary person in the art to which the present invention pertains so long as a leakage of light to the corner area of the LCD device is prevented by altering at least one of the structures of the bottom cover, the guide panel, and the top cover.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
a liquid crystal panel;
a light source substrate disposed at the side of a lower portion of the liquid crystal panel and including a plurality of light sources mounted thereon and emitting light;
a light guide plate disposed at the lower portion of the liquid crystal panel and guiding light made incident from the light sources toward the liquid crystal panel;
a bottom cover having a bottom surface and first wall surfaces extending upward from the bottom surface, adjacent first wall surfaces defining a first separated space extending an entire distance between an upper edge of the first wall surfaces and the bottom surface; and
a guide panel having an upper surface and second wall surfaces extending downward from the upper surface, adjacent second wall surfaces defining a second separated space extending an entire distance between a lower edge of the second wall surfaces and the upper surface, the bottom cover and the guide panel coupling the light guide plate and the light source substrate; and
a top cover having a top surface and third wall surfaces extending downward from the top surface, adjacent third wall surfaces defining a third separated space extending an entire distance between a lower edge of the third wall surfaces and the top surface, the top cover surrounding upper edges of the liquid crystal panel and coupled with the bottom cover and the guide panel to couple the liquid crystal panel, the light guide plate and the light source substrate,
wherein the first, second, and third separated spaces are not aligned so that the light from the light source cannot pass through the first, second, and third separated spaces in a straight line path, and
wherein the first separated space is spaced apart from the corner of the bottom cover to not be at the corner of the bottom cover.

2. The device of claim 1, wherein the first separated space of the bottom cover is not aligned with the corner of the bottom cover.

3. The device of claim 1, wherein the second separated space of the guide panel is aligned with the corner of the guide panel.

4. The device of claim 1, wherein the third separated space of the top cover is aligned with the corner of the top cover.

5. The device of claim 1, further comprising: an optical sheet disposed at an upper portion of the light guide plate to improve the efficiency of light supplied to the liquid crystal panel.

6. The device of claim 1, wherein the light source comprises a light emitting diode.

* * * * *